(12) United States Patent
Janeczek (10) Patent No.: US 10,289,510 B1
(45) Date of Patent: May 14, 2019

(54) INTELLIGENT PLATFORM MANAGEMENT INTERFACE FUNCTIONAL FUZZER

(71) Applicant: EMC Corporation, Hopkinton, MA (US)

(72) Inventor: Craig Janeczek, Worcester, MA (US)

(73) Assignee: EMC CORPORATION, Hopkinton, MA (US)

(*) Notice: Subject to any disclaimer, the term of this patent is extended or adjusted under 35 U.S.C. 154(b) by 497 days.

(21) Appl. No.: 14/580,612

(22) Filed: Dec. 23, 2014

(51) Int. Cl.
*G06F 11/30* (2006.01)
*G06F 11/22* (2006.01)
*G06F 11/26* (2006.01)

(52) U.S. Cl.
CPC ...... *G06F 11/2273* (2013.01); *G06F 11/2294* (2013.01); *G06F 11/30* (2013.01); *G06F 11/26* (2013.01)

(58) Field of Classification Search
CPC .......... G06F 11/2273; G06F 11/2289; G06F 11/2661; G06F 11/079; G06F 11/22; G06F 11/2205; G06F 11/221; G06F 11/2231; G06F 11/2242; G06F 11/2252; G06F 11/2292; G06F 11/2294; G06F 11/30; G06F 11/26
USPC ....................................................... 702/122
See application file for complete search history.

(56) References Cited

U.S. PATENT DOCUMENTS

| | | | | |
|---|---|---|---|---|
| 2014/0082419 | A1* | 3/2014 | Untinen | H04L 43/18 714/27 |
| 2014/0195657 | A1* | 7/2014 | Bhatia | G06F 13/42 709/223 |
| 2014/0351797 | A1* | 11/2014 | Kalayci | G06F 11/3696 717/127 |
| 2015/0100829 | A1* | 4/2015 | Nanjundappa | G06F 11/3688 714/38.1 |

OTHER PUBLICATIONS

"The System Bus", "Intelligent Platform Management Bus/Bridge (IPMB)", Design of Digital and Microcomputer Systems, Winter Session, Term 2, 1998/1999.
"Advanced Systems Format (ASF) Specification," Revision 01.20.06, of Microsoft Corporation, Jan. 2012. (104 pages).
"Intelligent Platform Management Interface (IPMI)" specification, version 2.0, revision 1.1, Oct. 1, 2013. (644 pages).

* cited by examiner

*Primary Examiner* — Sujoy K Kundu
*Assistant Examiner* — Lynda Dinh
(74) *Attorney, Agent, or Firm* — Day Pitney LLP (57) ABSTRACT

A method for testing communication within a computing platform is provided. The method includes selecting a system-level message configured for device level communication within the computing platform; incorporating false data into a data field of the message; sending the message containing false data to a destination device; and, monitoring behavior of the destination device. A computer program product and a system are described.

16 Claims, 5 Drawing Sheets

User Interface - 621

```
MESSAGE : Open Session Request
Fail Auth Payload - Length : 08 -> 43
Fail Auth Payload - Length : 08 -> AB
Fail Auth Payload - Length : 08 -> CC
Fail Conf Payload - Length : 08 -> 7C
Fail IPMI Payload Length : 0020 -> 0001
Fail IPMI Payload Length : 0020 -> 0083
Fail IPMI Payload Length : 0020 -> 4320
Fail IPMI Payload Length : 0020 -> 5564
Fail IPMI Payload Length : 0020 -> F120
Fail Integ Payload - Length : 08 -> 38
Fail Integ Payload - Length : 08 -> C1
Fail Message Tag : 00 -> 35
Fail Remote Console Session ID : 500BB34C -> 500BB34C
Fail Remote Console Session ID : 5592B7B9 -> 55B27E27
Fail Remote Console Session ID : 76700BDE -> E0705885
Fail Remote Console Session ID : D583985D -> 53836817
MESSAGE : RAKP Message 1
Fail IPMI Payload Length : 0021 -> 7921
Fail IPMI Payload Length : 0021 -> A021
Fail IPMI Payload Length : 0021 -> EC21
Fail Message Tag : 00 -> 41
Fail Message Tag : 00 -> 45
Fail Message Tag : 00 -> C0
Fail Message Tag : 00 -> F7
RAKP Message 2 error : Illegal or unrecognized parameter, 18
RAKP Message 2 error : Illegal or unrecognized parameter, 18
MESSAGE : RAKP Message 3
Fail IPMI Payload Length : 0021 -> 0096
Fail IPMI Payload Length : 0021 -> 00B2
Fail IPMI Payload Length : 0021 -> 331C
Fail IPMI Payload Length : 0021 -> 3A1C
Fail IPMI Payload Length : 0021 -> 581C
Fail IPMI Payload Length : 0021 -> DFA3
Fail Message Tag : 00 -> 74
Fail Message Tag : 00 -> 8F
Fail Message Tag : 00 -> 91
Fail Message Tag : 00 -> AB
Fail Message Tag : 00 -> BB
Fail Message Tag : 00 -> BE
```

INTELLIGENT PLATFORM MANAGEMENT INTERFACE FUNCTIONAL FUZZER

BACKGROUND OF THE INVENTION

1. Field of the Invention

The invention disclosed herein relates to techniques for testing computer components, and in particular, techniques for combining functional testing with fuzz testing.

2. Description of the Related Art

As computer components have become increasingly complex, efforts have been made to simplify management and further development. Among these efforts is standardization of protocols, interfaces, instruction sets and the like. One standard is the Intelligent Platform Management Interface (IPMI) specification. IPMI is a standard for system-monitoring interfacing and has been widely adopted by a variety of vendors. Generally, IPMI provides a set of computer interface specifications for an autonomous computer subsystem that provides management and monitoring capabilities independently of the host system's CPU, firmware (BIOS or UEFI) and operating system.

IPMI operates independently of the operating system (OS) to allow administrators to manage a system remotely in the absence of an operating system or of the system management software. IPMI is a message-based, hardware-level interface specification, The IPMI standard specifies requirements for hardware and software. IPMI includes a management controller (MC) and a baseboard management controller (BMC). The baseboard management controller (BMC) is the intelligence in the IPMI architecture. It includes a microcontroller embedded on the motherboard of a computer, such as a server. The BMC manages the interface between system management software and platform hardware.

The BMC exposes two main communication interfaces to the host. The interfaces include a keyboard controller style (KCS) interface and a local area network (LAN) interface. These interfaces may communicate erroneous data to the BMC from external components.

Testing of the BMC interface is vital to ensure performance when deployed. That is, it is desirable to harden the interfaces to ensure that the BMC properly handles error conditions instead of crashing or providing extra privileges to the end user.

SUMMARY OF THE INVENTION

In one embodiment, a method for testing communication within a computing platform is provided. The method includes selecting a system-level message configured for device level communication within the computing platform; incorporating false data into a data field of the message; sending the message containing false data to a destination device; and, monitoring behavior of the destination device.

The destination device may include a baseboard management controller (BMC). The message may be sent through one of a LAN interface and a keyboard controller style (KCS) interface. The false data may include one of invalid, unexpected and random data. The behavior may include one of a system crash, failing of a built-in code assertion, inception of the memory leak, and acceptance of the false data. Monitoring the behavior may include comparing a test result to an expected output. The method may further include logging the behavior of the destination device as a test result. The method may further include using the test result for at least one of replication of the behavior and remediation of the behavior; and the expected output may include at least one of an expected completion code and an expected response length.

The method for testing communication may further include: upon identification of an expected error as a result of the message containing the false data, sending the system-level message without the false data; completing the communication; and evaluating the communication for errors.

The system-level message may be a message associated with one of the "Intelligent Platform Management Interface (IPMI)" specification, version 2.0 and the "Advanced Systems Format (ASF) Specification," Revision 01.20.06, of Microsoft Corporation, January 2012.

In another embodiment, a computer program product including machine executable instructions stored on non-transitory machine readable media is provided. The instructions are configured for testing communication within a computing platform, the instructions including instructions for selecting a system-level message configured for device level communication within the computing platform; incorporating false data into a data field of the message; sending the message containing false data to a destination device; and, monitoring behavior of the destination device.

The computer program product may further include a knowledge database including information descriptive of the computing platform; the knowledge database may include a description of at least one of: system-level messages; system-level procedures; and errors expected from the false data. The computer program product may further include a system operator for executing the instructions; the system operator may include at least one of a protocol interface, a test execution tool and an error monitor. The computer program product may include a user interface; the user interface may include at least one of a configuration interface and a logging tool. At least a portion of the machine executable instructions are configured to execute remotely.

In another embodiment, a system for testing communication within a computing platform is provided. The system include a remote console configured for selecting a system-level message configured for device level communication within the computing platform; incorporating false data into a data field of the message; sending the message containing false data to a destination device; and, monitoring behavior of the destination device, the remote console in communication with the computing platform in order to perform the sending and the monitoring.

BRIEF DESCRIPTION OF THE DRAWINGS

The features and advantages of the invention are apparent from the following description taken in conjunction with the accompanying drawings in which.

DETAILED DESCRIPTION OF THE INVENTION

Disclosed herein is a testing tool for testing message based communications protocols implemented in computing systems. In the exemplary embodiment, the testing tool is provided in the context of the Intelligent Platform Management Interface (IPMI) specification. However, the testing tool is not limited to use with this specification.

Generally, the testing tool combines the positive testing accomplished by functional testing and the negative testing accomplished by fuzz testing to provide enhanced testing capabilities. That is, by combining functional testing and fuzz testing, the testing tool provides for more thorough testing than would be achieved by separately conducting functional testing and fuzz testing. More specifically, by interleaving fuzz testing and functional testing, the testing tool is able to find packets that would crash the BMC as well as packets that the BMC does not handle correctly.

In order to better understand aspects of the teachings herein, some additional context is now provided.

As discussed herein, "Intelligent Platform Management Interface (IPMI)" refers to a specification that defines standardized, abstracted interfaces. IPMI provides for platform management within a system and between multiple systems. Generally, "platform management" refers to monitoring and control functions that are built into platform hardware and are used for monitoring aspects of the platform hardware. Parameters that are monitored may include system temperatures, voltages, output of power supplies, error tracking, status of system fans and other such aspects. Platform management may also include logging of parametric data.

The exemplary embodiment of the invention makes reference to the Intelligent Platform Management Interface (IPMI), referred to herein as the "standard," and as "IPMI," and by other similar references thereto. Specifically, the standard includes the specification provided as "Intelligent Platform Management Interface (IPMI)" v2.0, document revision 1.1, dated Oct. 1, 2013, as well as updates thereto. This specification and the applicable updates are incorporated by reference herein in their entirety. Where any conflicts may exist between this disclosure and the standard, one should interpret the conflicts narrowly and in a manner that is most favorable to the teachings herein.

In other embodiments, the testing tool is used with other message based communications protocols. Examples of other message based protocols where the testing tool may be used include: IPMI, ASF (see below), an EMC internal standard, referred to as "ESES" (produced by EMC Corporation of Hopkinton Mass., and other similar message-based protocols.

As discussed herein, "fuzz testing," "fuzzing" and other similar terms generally refer to a software testing technique that involves providing invalid, unexpected, or random data (that is, "false" data) to the inputs of a computer program used for performance testing. The program is then monitored for exceptions such as crashes (i.e., termination of operation), failing of a built-in code assertion, inception of a memory leak, acceptance of the false data and other similar issues.

As discussed herein, "functional testing" generally refers to a quality assurance (QA) type of testing that bases test cases on the specifications of the software component under test. Functions are tested by feeding them input and examining the output. Functional testing usually verifies a program by checking the output against design specifications. Functional testing may involve identification of functions that the software is expected to perform; creation of input data; determination of expected output; execution; and comparison of actual output with the specification.

Generally, an IPMI sub-system includes a main controller, called the "baseboard management controller (BMC)" and may include other management controllers distributed among different system modules that are referred to as "satellite controllers." The satellite controllers connect to the BMC via the system interface called the "Intelligent Platform Management Bus/Bridge (IPMB)." The BMC connects to the satellite controllers or another BMC in another system via an Intelligent Platform Management Controller (IPMC) bus or bridge. The BMC may be managed using Remote Management Control Protocol (RMCP), a specialized protocol defined by this specification. A variant of the Remote Management Control Protocol (RMCP), RMCP+, may be used for managing the BMC through a local area network (LAN).

The LAN interface specifications define how IPMI messages can be sent to and from the BMC encapsulated in RMCP (Remote Management Control Protocol) packets datagrams. This capability is also referred to as "IPMI over LAN." IMPI also defines the associated LAN-specific configuration interfaces for setting things such as IP addresses other options, as well as commands for discovering IPMI-based systems.

Information regarding management controllers, sensors and various other components is of limited value without System Management Software (SMS) to interpret, handle, and present the information. System Management Software (SMS) takes platform management information and links it into other aspects of systems management, such as software management and distribution, alerting, remote console access, etc. The system management software (SMS) implements communication through system-level messaging.

Figure 1:
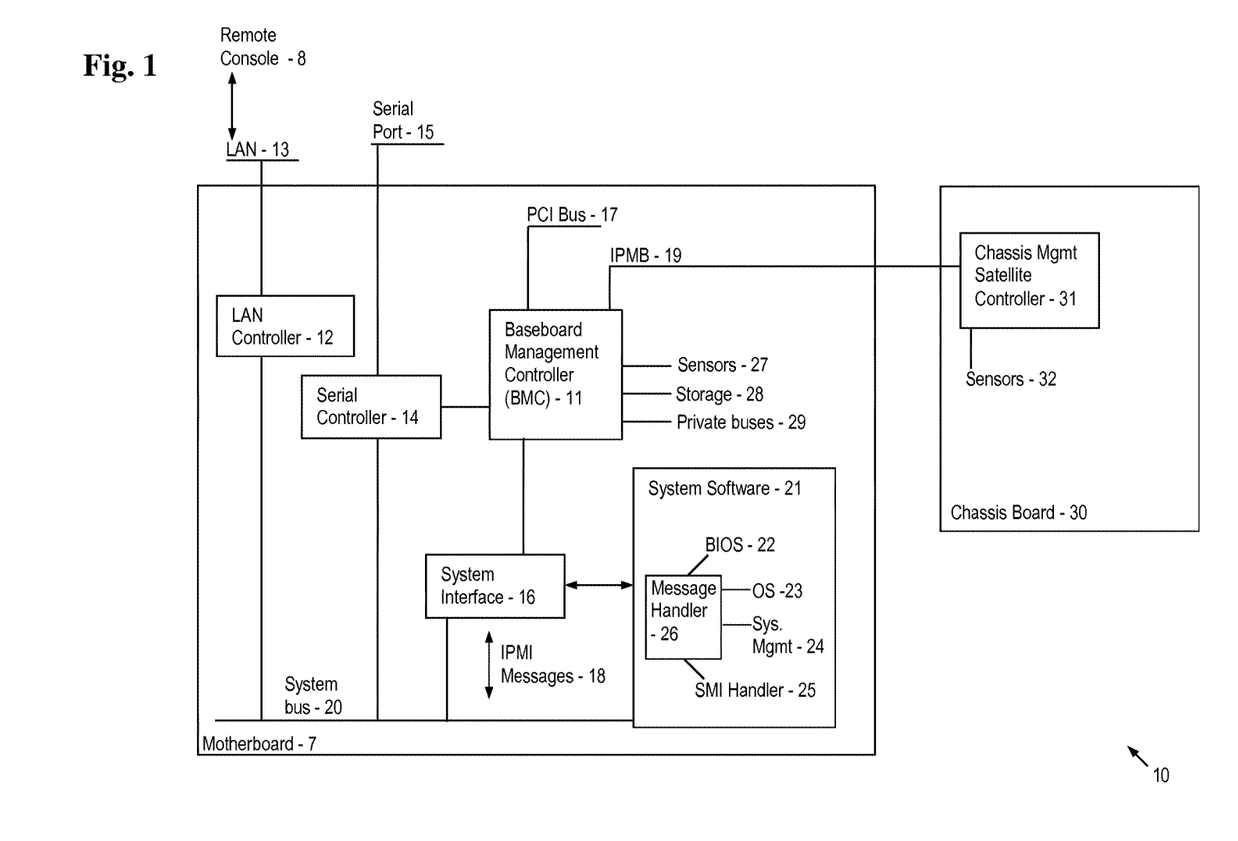
FIG. 1 is an schematic diagram depicting aspects of an exemplary computing device configured for implementation of the teachings herein.

Referring now to FIG. 1, there are shown aspects of an exemplary computing platform 10. In the exemplary embodiment, the computing platform 10 is designed in accordance with the requirements of the "Intelligent Platform Management Interface (IPMI)" specification, however this is not to be construed as limiting. The embodiment of the computing platform 10 depicted in FIG. 1 is merely illustrative of some aspects of computing platforms in general. It is to be understood that other components and additional detail may be incorporated into the computing platform 10 and practiced with the teachings disclosed herein.

In the exemplary embodiment, the computing platform 10 includes a motherboard 7 and at least one chassis board 30. The motherboard 7 contains a system bus 20. Components in communication with the system bus 20 include a local area network (LAN) port 13 through a LAN controller 12 and a serial port 15 through a serial controller 14. Other devices may be in communication with the system bus 20 through at least one of the LAN port 13 and the serial port 15. Also included in the computing platform 10 is a baseboard management controller (BMC) 11. Coupled to the baseboard management controller (BMC) 11 is a PCI bus 17 and an intelligent platform management bus (IPMB) 19. Further, the baseboard management controller (BMC) 11 may directly or indirectly control at least one sensor 27, data storage 28, and at least one specialized or private bus 29. The baseboard management controller (BMC) 11 is in communication with the system bus 20 through system interface 16. Generally, the system interface 16 issues IPMI messages 18 over the system bus 20. The IPMI messages 18 may originate with the baseboard management controller (BMC) 11 or within system software 21. IPMI messages may also travel through the LAN port 13 to an external system, or through the intelligent platform management bus (IPMB) 19 to/from another baseboard management controller (BMC) 11. Generally, the system software 21 includes a built-in operating system (BIOS) 22, an operating system (OS) 23, system management software 24, and a system management interrupt (SMI) handler 25. The various forms of system software 21 may be managed by message handler 26.

A remote console 8 may communicate with the baseboard management controller (BMC) 11 through the LAN port 13 and the LAN controller 12.

Generally, the intelligent platform management bus (IPMB) 19 provides for interconnection of the baseboard management controller (BMC) 11 and the chassis board 30. The intelligent platform management bus (IPMB) 19 may be configured for operation of specific protocols to provide for communications between a variety of management controllers.

Generally, the computing platform 10 depicted in FIG. 1 provides a system that offers monitoring and recovery features implemented directly in hardware and firmware. Inventory, monitoring, logging and recovery control functions are available independent of a main processor and the built-in operating system (BIOS) 22 or the operating system (OS) 23. Platform management functions may also be provided when the computing platform 10 is in a powered down state.

Many aspects of the computing platform 10 are implemented through the baseboard management controller (BMC) 11. The baseboard management controller (BMC) 11 manages interfacing between system management software (SMS) and platform management hardware, provides autonomous monitoring, event logging and recovery control and serves as a gateway between system management software (SMS) and other components such as components available through the intelligent platform management bus (IPMB) 19.

Generally, the computing platform uses message-based interfaces for communication between the various devices. Exemplary devices include the intelligent platform management bus (IPMB) 19, the LAN port 13, the system software 21 and other components not introduced herein. Generally, the messages (such as the IPMI messages 18) include a standardized structure. Included within each message is a "payload." Generally, the term "payload" refers to the information bearing fields of a message. This is separate from those fields and elements that are used to transport the message from one point to another, such as an address field, framing bits, checksums and other portions that may be included in each message. In some instances, a given field may be both a payload field and a transport field.

Generally, the computing platform 10 includes standardized system interfaces for transferring messages to the baseboard management controller (BMC) 11. That is, the baseboard management controller (BMC) 11 is exposed to external components (such as remote console 8) through various interfaces. Two interfaces are of particular interest. A first interface is with the LAN 13, and a second interface is referred to as a keyboard controller style (KCS) interface.

The LAN interface is an external interface. Accordingly, anyone on a network to which the computing platform 10 communicates, may communicate with the baseboard management controller (BMC) 11. Accordingly, the baseboard management controller (BMC) 11 implements an authentication protocol to limit security issues, errors and corruption. In the exemplary embodiment, the baseboard management controller (BMC) 11 implements Remote Management Control Protocol plus (RMCP+) as the authentication protocol. If a communications error occurs and breaks authentication, it may be possible to gain unauthorized access to the baseboard management controller (BMC) 11. Aspects of messaging including over the LAN interface are introduced and described in detail in Chapters 1 through 8 and 13 of the Intelligent Platform Management Interface Specification (which is incorporated by reference herein).

The keyboard controller style (KCS) interface is generally specified for system management software (SMS) messages. System management software (SMS the uses the keyboard controller style (KCS) interface will typically be running under a multitasking operating system (OS) 23. This means that transfers with the baseboard management controller (BMC) 11 may be interrupted by a higher priority tasks were delayed by other system management software processing. Aspects of messaging over the keyboard controller style (KCS) interface are introduced and described in detail in Chapter 1 for 9 of the Intelligent Platform Management Interface Specification (which is incorporated by reference herein).

Authenticated communication to the BMC is accomplished by establishing a session. Once established, a session may be identified by a Session ID. The Session ID may be thought of as a handle that identifies a connection between a given remote user and the BMC using either the LAN port 13 or a serial/modem connection through the serial port 15.

Further aspects of the components of the computing platform 10 are included in the IPMI specification. The IPMI specification may be referred to for additional detail on the foregoing concepts. Having thus introduced aspects of the computing platform 10, the testing tool is now described in greater detail.

Generally, the testing tool is provided as a set of machine executable instructions stored in a non-transitory machine readable media. Exemplary embodiments of non-transitory machine readable media include data storage, firmware, and other types of non-transitory machine readable media as are known in the art. Additionally, the testing tool may be maintained remotely from the computing platform 10 in configured to perform assigned tasks through an interface such as the LAN port 13. As a matter of convention, the testing tool may be referred to as an "application," and as "software," and by other similar terms.

The testing tool provides capabilities to stress (that is, provide rigorous testing for) the KCS interface and the LAN interface with random data modeled after valid data. The testing tool includes information on the protocol being tested. Thus, the testing tool may check for errors at many different levels. The testing tool also has the capability to attempt recovery from injected errors and check that the recovery path works correctly.

The testing tool may also perform command stressing through the LAN interface. For the LAN interface, error injection may be provided in the form of packet fuzzing on the RMCP+ authentication protocol. By keeping most bytes of the packet valid, the testing tool is adapted to identify minor issues that might otherwise be passed through testing. Leveraging the fact that the testing tool understands communications protocols including the handshaking procedure as well as the error codes, the testing tool can properly detect errors with a much higher accuracy than other fuzzing tools.

The testing tool provides for stressing the KCS interface with command fuzzing. This approach stresses communications protocols by randomly selecting a command to issue and then randomly selecting data to send. The tool checks the data to see what the BMC was supposed to return and verifies that the BMC responds correctly to both valid and invalid tests.

Figure 2:
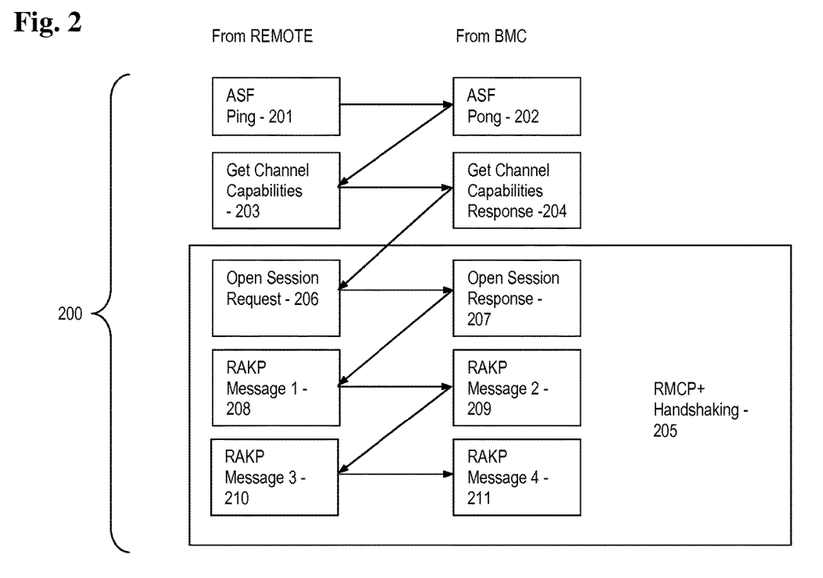
FIG. 2 is a flow chart depicting aspects of handshaking procedure.

FIG. 2 provides a flow chart for establishing a connection 200 implemented by the RMCP+ protocol. In the procedure for establishing a connection 200, a first message originates in a remote console and is provided to the BMC 11 through the LAN interface. In turn, the BMC 11 replies to the remote console. In a first step 201, the remote console issues a ping, such as an ASF compliant ping. The ping is an RMCP ping that tests the connection between the remote console and the BMC. This special ping tests that there is a connection and if the IPMI protocol is supported. In a second step 202, the BMC issues an acknowledgement (i.e., a pong), such as an ASF compliant pong. As used herein, "ASF" generally refers to "Alert Standard Format," which is a specification describing an extensible file format designed to store coordinated digital media data. The ASF standards are provided in the reference "Advanced Systems Format (ASF) Specification," Revision 01.20.06, of Microsoft Corporation, January 2012. This reference is incorporated herein by reference in its entirety.

In a third step 203 and a fourth step, a "Get Channel Capabilities" command is issued by the remote console and a response is issued from the BMC. The Get Channel command is used to retrieve capability information about the channel that the message is delivered over, or for a particular channel. The command returns the authentication algorithm support for the given privilege level.

Once the response is issued in the fourth step 204, a handshaking procedure 205 begins. In a fifth step 206, the remote console asks to open a session and provides a requested maximum privilege level, authentication algorithm, integrity algorithm and confidentiality algorithm to use. In a sixth step 207, the BMC will respond with associated permissions or an error code.

Subsequently, RAKP messages are communicated between the remote console and from the BMC. Generally, the RAKP messages are transferred in the payload portion of an IPMI over LAN packet with a Format field set to "RMCP+". The Payload Type field indicates which RAKP message is held in the IPMI Payload portion of the packet.

In the communication of the RAKP messages, the remote console requests a privilege level and provides some other login information such as the username. The BMC looks up the username privilege combination and then performs some hashing using the internal password to send to the remote device. The remote device checks the BMC sent hashed data using the password on its side, and then performs a similar hashing procedure on different information to send to the BMC. The BMC confirms that the hash sent to it is correct and then finally responds with one more hash value. If that entire procedure passes, then the session is now open at the requested privilege level. This is a complex multi-step process with a lot of variables being sent back and forth to and from the BMC. The testing tool provides for testing this process and all of the associated variables to ensure that the BMC properly handles all options.

Specifically, in a seventh step 208, the remote console sends RAKP message 1. The remote console sends this RAKP message to the BMC to begin the session authentication process. The remote console selects a Remote Console Random Number, a Maximum Requested Privilege Level (Role), and an optional User Name and sends them to the managed system along with the Managed System Session ID specified by the client on the previous RMCP+ Open Session Response. Upon receiving RAKP Message 1, the BMC verifies that the message contains an active Managed System Session ID and that a session can be created using the given user information and security algorithm proposal. In an eighth step 209, the BMC responds with an RAKP Message 2.

In the eighth step 209, the BMC sends the RAKP Message 2 to the remote console in response to the receipt of an RAKP Message 1. Once RAKP Message 1 has been validated, the BMC selects a Managed System Random Number and computes a Key Exchange Authentication Code (or any one of a multiplicity of codes) over the values specified by the RAKP algorithm. The BMC sends those values along with the Managed System Global Unique ID (GUID) and the Remote Console Session ID (sent by the console on the previous RMCP+ Open Session Request) to the remote console.

Upon receiving RAKP Message 2, the remote console verifies that the Remote Console Session ID is active and that the Managed System GUID matches the managed system that the remote console has associated with the session. The remote console then validates the Key Exchange Authentication Code and responds with an RAKP Message 3 in a ninth step 210.

In the ninth step 210, the remote console sends the RAKP Message 3. The remote console sends RAKP Message 3 to the BMC in response to the receipt of the RAKP Message 2. Once the remote console validates the RAKP Message 2, the remote console creates a Session Integrity Key using the values specified by the RAKP algorithm. The remote console then computes an Integrity Check Value over the values specified by the RAKP algorithm, and sends the integrity check value along with the Managed System Session ID (sent by the BMC on the previous RMCP+ Open Session Response message) to the BMC.

In a tenth step 211, after receiving RAKP Message 3, the BMC verifies that the Managed System Session ID is active and then validates the Integrity Check Value. If the Integrity Check Value is valid, the BMC creates a Session Integrity Key using the values specified by the RAKP algorithm. With the shared Session Integrity Key in place, integrity protected messages can now be exchanged between the remote console and the BMC.

In short, the procedure for establishing a connection 200, which includes a handshaking procedure 205, calls for communication of numerous data packets between the remote console and the BMC. Anyone or more of the data packets may be corrupted or otherwise include an error. Among other things, the effect of corrupt or erroneous data packets on the behavior of the procedure for establishing a connection 200 and the handshaking procedure 205 is evaluated by the testing tool.

Figure 3:
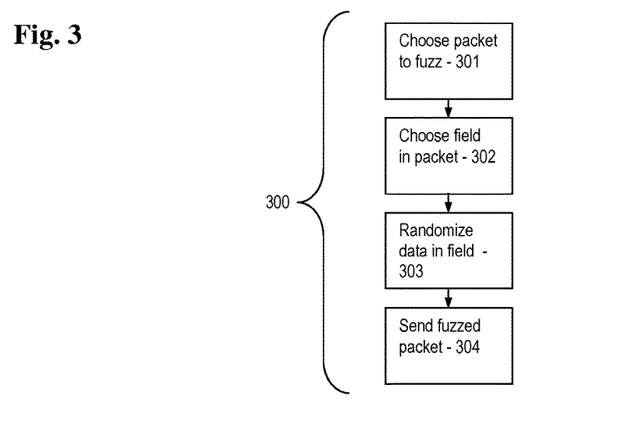
FIG. 3 is a flow chart depicting aspects of a packet fuzzing procedure.

FIG. 3 is a flowchart depicting an exemplary method for fuzzing a packet 300. In a first step 301, the testing tool chooses a data packet to fuzz. Once the data packet has been selected in the first step 301, the testing tool proceeds to a second step 302.

In the second step 302, the testing tool selects a data field within the selected data packet. The data field may be selected by progressing through a logical sequence of data fields within the data packet, or by random selection. In either case, once the data field has been selected in the second step 302, the testing tool proceeds to a third step 303.

In the third step 303, the testing tool randomizes data for replacement of the data field. Randomizing data for the data field may be performed in any manner deemed appropriate. For example, data that may be unrelated to the procedure for establishing a connection 200 and the messages associated there with may be included in the data field. More specifically, and by way of example, random numbers, letters or other characters may be inserted into the data field. In this example, the random data may be reflective of a data field that has been corrupted during communications. In another example, randomized data for the data field may be determined by a Monte Carlo process. More specifically, and by way of example, random data for the data field may include command language or other such structures that may not be particularly appropriate for the given data packet, but a part of the overall command structure. In either case, once the randomized data has been inserted into the data field (thus providing a "fuzzed data packet") in the third step 303, the testing tool proceeds to a fourth step 304.

In a fourth step 304, the testing tool sends the fuzzed data packet to the appropriate device (that is, one of the remote console and the BMC).

Generally, by leaving all but one of the data fields within a data packet intact, the testing tool provides a tool for isolating errors that may arise from a single field within a single message.

Figure 4:
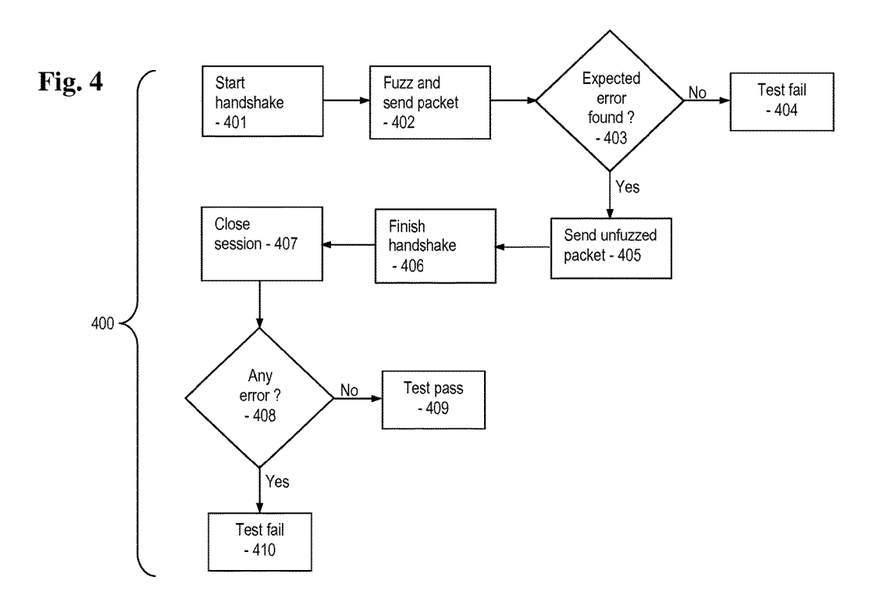
FIG. 4 is a flow chart depicting aspects of a packet test procedure.

FIG. 4 is a flowchart depicting an exemplary method for fuzzing a handshake 400. In a first step 401, the handshaking procedure 205 is started. In a second step 402, the method for fuzzing a packet 300 is implemented. In a third step 403, output of the device under test is evaluated. If an expected error occurs, then the test is a success. If the expected error does not occur, that the test is determined as a failure in a fourth step 404. If the test is a success, then the same message is sent without the fuzzed packet in a fifth step 405. Handshaking is completed in a sixth step 406. Subsequently, the session is closed in a seventh step 407. Results of the handshaking process are evaluated in an eighth step 408. If no errors are detected in the handshaking process, the test is deemed to have passed in a ninth step 409. If errors are detected in the handshaking process, the test is deemed to have failed in a tenth step 410.

The exemplary method for fuzzing a handshake 400 provides operators with an ability to understand error cases and recover from them. The exemplary method for fuzzing a handshake 400 identifies capabilities of the BMC to handling invalid packet as well as capabilities to resume operation at a stage prior to delivery of the bad packet.

Figure 5:
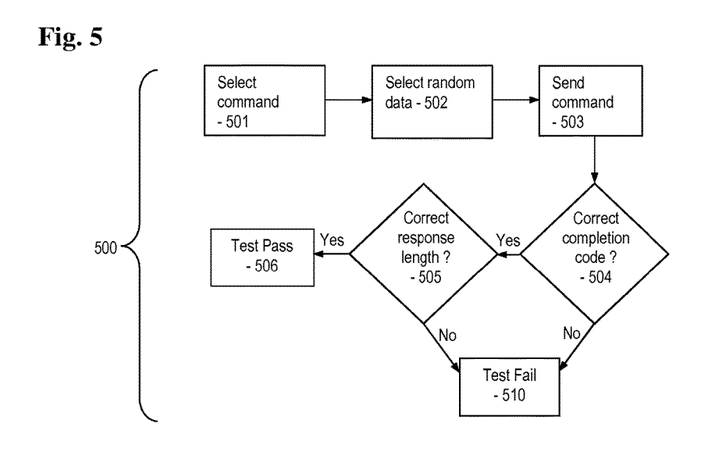
FIG. 5 is a flow chart depicting aspects of a command test procedure.

FIG. 5 is a flowchart depicting an exemplary method for testing a command 500. The method for testing a command 500 leverages the capabilities of the testing tool to dynamically generate a fuzzing test with random data. Further, the method for testing a command 500 leverages capabilities of the testing tool to provide functional testing by determining a valid completion code and response length for the data provided. If the data or completion code returned by the BMC is not correct, the BMC will fail the test.

In a first step 501 of the exemplary method for testing a command 500, a command for testing is selected. In a second step 502, random data is inserted into the command using the fuzzing process described above. In a third step 503, the fuzzed command is sent to the device. In a fourth step 504, a completion code is evaluated. If the completion code is incorrect, then the test is deemed a failure as shown in block 510. If the completion code is correct, then the length of the response is evaluated in a fifth step 505. If the response length is incorrect, then the test is deemed a failure as shown in block 510. If the response length is correct, then the test is deemed to have passed as shown in block 506. This is a basic approach which may be used for all commands. In some embodiments, additional optional tests may be run on the response received from the BMC Having introduced the testing tool, some additional aspects and embodiments are now presented.

The testing tool provides a superior facility for RMCP+ error checking. Among other things, the testing tool checks for the proper response from every packet sent. This allows the testing tool to identify errors that may seem relatively benign or unlikely, as well as those that may occur in rare situations. By testing recovery paths from errors injected by the testing tool, the testing tool ensures that the BMC can still be taken out of the error state and that an attacker cannot leverage the BMC into a vulnerable state. In contrast, prior art testing tools for RMCP packets fuzz a packet, send the fuzzed packet through the entire handshaking procedure and then check that the BMC is still alive. By not checking error codes or recovery paths the prior art testing tool is not validating that the BMC can handle the invalid input as it occurs.

In general, the testing tool may be provided with substantial resources. The resources include a knowledge base describing protocols and commands used in the computing platform 10. By providing the testing tool with the knowledge base, it is possible to develop test packets that were previously unavailable. For example, by selecting a random command data combination, the testing tool may be used to ensure that both valid and invalid combinations of data are tested. The testing tool will thus internally determine whether the command and data combination should return a valid or invalid completion code and how long a response should be. The testing tool within validate the response with a proper completion code in response length. In contrast, prior art testing tools send random data and then check that the BMC is operating properly by sending a valid command and checking for a response.

Exemplary scenarios for use of the testing tool are now provided.

Example 1—Command stressing pass. In this example, the testing tool sends a randomly selected command. For example, the testing tool may have randomly selected the "Get Device ID command" and selected to not send any data along with it. This is the valid case for this command so the tool would look for 15 bytes of data with a completion code of 0x00.

Since the data is valid, the BMC would respond with the expected 15 bytes of data and a completion code of 0x00. The testing tool would mark this as a pass. This test is an example of the testing tool running a positive test on a command.

Example 2—Command stressing fail. In this example, the testing tool sends a randomly selected command. For example, the testing tool may have also selected the same "Get Device ID command" but would select to send the data "0x00 0x01" with it. Since this is not the valid case for the command, the testing tool would expect a failing completion code and no data.

Assume that there is an issue in the BMC and this command is treated as valid, the BMC would then respond with a valid completion code and the valid 15 bytes of return data. The testing tool would see that the response does not match the expected response and call the test a fail. The testing tool would then log the input and the output values to be evaluated later to see what type of failure occurred.

Example 3—Packet stressing pass. In this example, the testing tool sends a data packet with a randomized data field. For example, the testing tool may have selected "RMCP Message 1" and fuzzed the username that gets passed through in this packet. The testing tool has changed the data from a valid username to random bytes of data. The testing tool would expect that the next packet back from the BMC would say that the username was invalid and continue by sending the un-fuzzed version of the packet.

Since the username is in fact invalid the BMC will see this and send an error packet back to the testing tool. The testing tool would see this, send the normal packet and continue with the handshaking process. Once the session was fully open, the testing tool would send the close session command. Since all of the commands were sent successfully the testing tool would mark this as a pass.

Example 4—Packet stressing fail. In this example, the testing tool sensor data packet with a randomized data field. For example, the testing tool may have selected "RMCP Message 1" and fuzzed the username in this packet. The testing tool has changed the data from a valid username to random bytes of data. The testing tool would expect that the next packet back from the BMC would say that the username was invalid and continue by sending the un-fuzzed version of the packet.

Assume that the BMC does not properly search for the username and decides that the invalid username that was received is actually valid. It would send a success error code in the next packet along with necessary information for the handshaking procedure. The testing tool would see this and mark the test as a failure. It would then log the packet that was fuzzed, the name of the field in the packet that was fuzzed, the correct data and the data that was actually sent.

Figure 6:
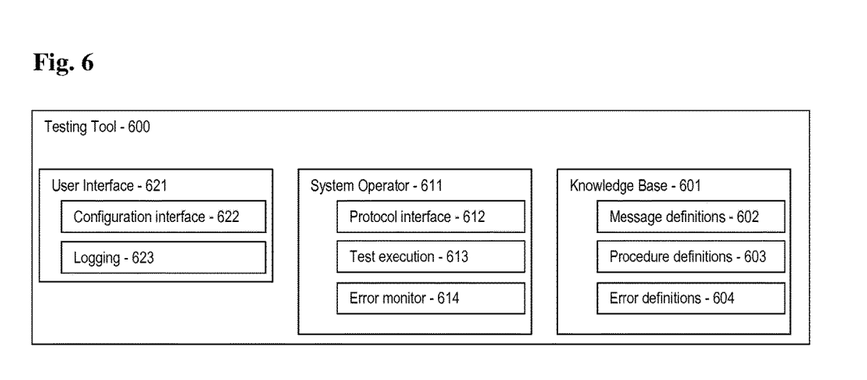
FIG. 6 is a schematic diagram depicting an exemplary architecture for the testing tool; and, FIGS. 7 and 8 are illustrations of exemplary output for a user interface.

Referring now also to FIG. 6, aspects of an exemplary embodiment of the testing tool 600 are shown. In the exemplary embodiment, the testing tool 600 includes a user interface 621, a knowledge database 601, and a system operator 611.

Generally, the user interface 621 includes a configuration interface 622 and a logging tool 623. The configuration interface 622 includes a central point for user input. The configuration interface 622 is used to select the protocol to fuzz as well as how to reach the target. For example, the configuration interface 622 may use a command line interface where the IP of the BMC is specified as well as the want to stress in the RAKP handshaking procedure. The logging tool 623 provides for logging output of tests. The logging tool 623 may be used as an input for replication and remediation of test failures. The logging tool 623 may be presented in a variety of forms, including as a log file holding the injected data that caused a failure case.

The knowledge database 601 includes information that is descriptive of a variety of aspects of the computing platform 10. More specifically, the knowledge database 601 may include message definitions 602, a procedure definitions 603, and error definitions 604. Other information may be included in the knowledge database 601 as well.

Generally, the message definitions 602 include descriptions of low level building blocks for each protocol, format information for each message (such as an "open session request" message). Generally, the procedure definitions 603 include descriptions of message sequences that are used in the selected protocol. For example, a description of the message sequencing for the RAKP handshaking procedure. Generally, the error definitions 604 include information on what injected readings should cause what errors. For example, when injecting invalid data in the "auth alg" field in the Open Session Request, the Open Session Response should be "Invalid Authentication Algorithm."

Generally, the knowledge function implemented by the testing tool 600 includes a command function and a handshaking function. For each command, there is identification information (for example, a Net Function and Command Number) as well as expected response lengths for valid input (invalid input should respond with one byte only, the invalid completion code) and a helper function which determines if the randomly selected data is valid or invalid. There are a couple optional helper functions per command. A pre-test function may be run before the test is run. The pre-test function can be used to ensure that the BMC is in a known good state before running the test. A good use case for this is the BIST (Built-in-Self-Test). Once the BIST is initiated, it can run for a couple minutes. While the BIST is running, the output of some functions may be different. The pre-test can be used to determine the BIST status expected output may be determined in advance. The output-check function is used to check output values if wanted. The output-check function is an extension of the functional testing into this tool. A cleanup function can be run after the test on valid input to restore the BMC to a known good state if the test would have reconfigured the BMC.

The handshaking function includes information about the format of each packet in an IPMI session as well as the order of how these packets need to be sent to open a session. The handshaking function enables creation and sending of packets to the BMC as well as parsing of response packets from the BMC. The handshaking function may be customized to allow for an individual packet to be fuzzed, which includes the information about how to find the error case and then re-send the correct packet after the known error case is found.

Generally, the system operator 611 provides tools for test execution. The system operator 611 may include a protocol interface 612, a test execution tool 613 and an error monitor 614. The protocol interface 612 provides an interface used to transmit the packets. For example, the protocol interface 612 opens a TCP/IP socket to send packets to the BMC over LAN. The test execution tool 613 includes core code that reads from the knowledge database 601 to run a test. The test execution tool 613 will refer to and follow procedures coded in the procedure definitions 603 and will fuzz messages contained in the message definitions 602. For example, and more specifically, the test execution tool 613 will provide code that creates a fuzzed packet and sends that fuzzed packet in a proper sequence. The error monitor 614 will compare the error definitions 604 and to test results. For example, the error monitor 614 will check that the completion code in the packet is what was expected based on the injected data.

Generally, the operation function of the testing tool 600 includes two sections. A command fuzzing section randomly selects a command from the database of commands (that is, the message definitions 602) and then runs any pre-test functions that are available for the command. Command fuzzing then runs the command and based on the response determines whether the test was a pass or a fail. Command fuzzing then runs the cleanup function, if cleanup is warranted after the respective command.

The handshaking fuzzing section instantiates a fuzzed IPMI session from the knowledge side of the tool and passes in a flag which determines which packet out of the handshake should be fuzzed. Since error conditions are inherent within the handshaking procedure for this case, the error detection may be performed while the session is being opened up. Creating a fuzzed LAN session could fall into either the operation or the knowledge side of the tool.

Figure 7:
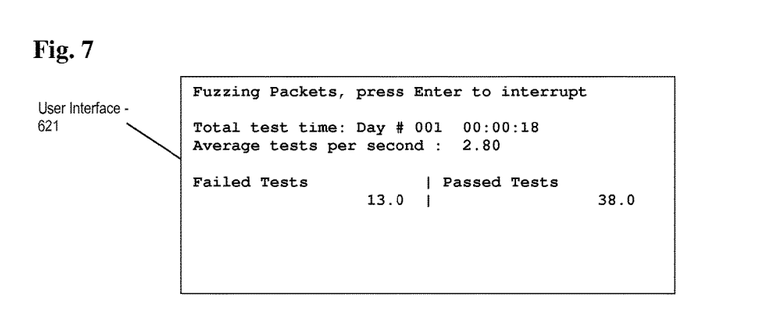

The operation function passes results up to the user interface. The user interface will log all failures. Generally, the user interface is presented as a command line prompt front end for the user. This front end may provide summary information like the current length of the test and the number of passed or failed tests (See FIG. 7). The log may include information for all failed tests including the original data that was fuzzed and the false data that was used to replace the original data. An example of a failing scenario is provided in the log shown in FIG. 8.

Generally, the testing tool 600 may be developed through any type of software development tools deemed appropriate. The testing tool 600 may be implemented through the remote console 8, such as by a processor associated therewith. In some embodiments, the testing tool 600 may include portions of machine executable instructions stored remotely on a non-transitory media, such as within the computing platform 10. For example, the testing tool 600 may include instructions for event trapping that are stored within the BMC 11. Remote instructions may be implemented by a local processor, microcontroller or other appropriate component.

As discussed herein, the testing tool 600 is substantially compliant with the "Intelligent Platform Management Interface (IPMI)" specification, version 2.0. That is, the testing tool 600 is generally configured for computing architectures described in the specification, and adheres to message formats described therein. This should not be construed to require any particular configurations of computing architectures beyond the elements described in the specification that give rise to the functionality of the Intelligent Platform Management Interface.

As discussed herein, the term "system-level" refers to the messages, procedures, errors and other communications parameters that are used for communications in message-based communications protocols. Generally, as used herein, the term "packet" refers to a message, and may refer more specifically (but not exclusively) to a message containing fuzzed data.

Various other components may be included and called upon for providing for aspects of the teachings herein. For example, additional materials, combinations of materials and/or omission of materials may be used to provide for added embodiments that are within the scope of the teachings herein.

A variety of modifications of the teachings herein may be realized. Generally, modifications may be designed according to the needs of a user, designer, manufacturer or other similarly interested party. The modifications may be intended to meet a particular standard of performance considered important by that party.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for improving performance of a communications interface within a computing platform by combined functional and negative testing of communication within the computing platform, the computing platform comprising a processor and a plurality of devices in communication with a system bus, the method comprising:
   selecting a system-level message configured for device level communication between at least two of the devices within the plurality of devices within the computing platform, wherein the system-level message is sent through one of a LAN interface and a keyboard controller style (KCS) interface;
   inputting one of quality assurance data and false data into a data field of the system-level message;
   sending the system-level message through the system bus to a destination device, wherein the destination device comprises a baseboard management controller (BMC);
   monitoring behavior of the destination device;
   comparing the behavior against a design specification to identify a test failure resulting from data incorporated into the data field and indicating an error condition;
   logging the behavior of the destination device as a test result, and providing the test result for at least one of acceptance of the behavior, replication of the behavior, and remediation of the behavior to provide proper handling of error conditions by the communications interface.

2. The method as in claim 1, wherein the false data comprises one of invalid, unexpected and random data.

3. The method as in claim 1, wherein the behavior comprises one of a system crash, failing of a built-in code assertion, inception of the memory leak, and acceptance of the false data.

4. The method as in claim 1, wherein monitoring the behavior comprises comparing a test result to an expected output.

5. The method as in claim 1, wherein the expected output comprises at least one of an expected completion code and an expected response length.

6. The method as in claim 1, further comprising:
   upon identification of an expected error as a result of the system-level message containing the false data, sending the system-level message without the false data;
   completing the communication; and
   evaluating the communication for errors.

7. The method as in claim 1, wherein the system-level message is a message associated with one of the "Intelligent Platform Management Interface (IPMI)" specification, version 2.0 and the "Advanced Systems Format (ASF) Specification," Revision 01.20.06, of Microsoft Corporation, January 2012.

8. A computer program product comprising machine executable instructions stored on non-transitory machine readable media, the instructions configured for improving performance of a communications interface within a computing platform by combined functional and negative testing of communication within a computing platform that comprises a processor and a plurality of devices in communication with a system bus, the instructions comprising:
- selecting a system-level message configured for device level communication between at least two of the devices within the plurality of devices within the computing platform, wherein the system-level message is sent through one of a LAN interface and a keyboard controller style (KCS) interface;
- inputting one of quality assurance data and false data into a data field of the system-level message;
- sending the system-level message through the system bus to a destination device, wherein the destination device comprises a baseboard management controller (BMC);
- monitoring behavior of the destination device;
- comparing the behavior against a design specification to identify a test failure resulting from data incorporated into the data field and indicating an error condition;
- logging the behavior of the destination device as a test result, and providing the test result for at least one of acceptance of the behavior, replication of the behavior, and remediation of the behavior to provide proper handling of error conditions by the communications interface.

9. The computer program product as in claim 8, further comprising a knowledge database comprising information descriptive of the computing platform.

10. The computer program product as in claim 9, wherein the knowledge database comprises a description of at least one of: system-level messages; system-level procedures; and errors expected from the false data.

11. The computer program product as in claim 8, further comprising an additional instruction set operable by the processor, the additional instruction set provided as a system operator for executing the instructions.

12. The computer program product as in claim 11, wherein the system operator comprises at least one of a protocol interface, a test execution tool and an error monitor.

13. The computer program product as in claim 8, further comprising a user interface.

14. The computer program product as in claim 13, wherein the user interface comprises at least one of a configuration interface and a logging tool.

15. The computer program product as in claim 8, wherein at least a portion of the machine executable instructions are configured to execute remotely.

16. A system for improving performance of a communications interface within a computing platform by combined functional and negative testing of communication within a computing platform that comprises a processor and a plurality of devices in communication with a system bus, the system comprising:
- a remote console configured for selecting a system-level message configured for device level communication between at least two of the devices within the plurality of devices within the computing platform, wherein the system-level message is sent through one of a LAN interface and a keyboard controller style (KCS) interface;
- inputting one of quality assurance data and false data into a data field of the system-level message;
- sending the system-level message through the system bus to a destination device, wherein the destination device comprises a baseboard management controller (BMC);
- monitoring behavior of the destination device, comparing the behavior against a design specification to identify a test failure resulting from data incorporated into the data field and indicating an error condition;
- logging the behavior of the destination device as a test result, and providing the test result for at least one of acceptance of the behavior, replication of the behavior, and remediation of the behavior to provide proper handling of error conditions by the communications interface;
- wherein the remote console is in communication with the computing platform in order to perform the sending and the monitoring.

\* \* \* \* \*